(12) United States Patent
Miller Shelton

(10) Patent No.: US 7,774,977 B2
(45) Date of Patent: Aug. 17, 2010

(54) TRELLIS AND TOOL SYSTEM

(76) Inventor: Deborah Ellen Miller Shelton, 4398 FM 2658, Henderson, TX (US) 75652

( * ) Notice: Subject to any disclaimer, the term of this patent is extended or adjusted under 35 U.S.C. 154(b) by 1193 days.

(21) Appl. No.: 11/360,841

(22) Filed: Feb. 23, 2006

(65) Prior Publication Data
US 2007/0193113 A1 Aug. 23, 2007

(51) Int. Cl.
*A01G 17/06* (2006.01)

(52) U.S. Cl. .......................................... 47/45

(58) Field of Classification Search .............. 47/44, 47/45, 47
See application file for complete search history.

(56) References Cited

U.S. PATENT DOCUMENTS

| | | | | |
|---|---|---|---|---|
| 212,604 | A | | 2/1879 | Jenks ............................. 47/47 |
| 601,691 | A | | 4/1898 | Watson ........................ 47/32.4 |
| 760,879 | A | | 5/1904 | Kunzman ....................... 47/47 |
| 764,472 | A | * | 7/1904 | Kessler .......................... 47/47 |
| 897,006 | A | | 8/1908 | Muller ........................... 47/47 |
| 936,619 | A | | 10/1909 | Foy ................................ 47/39 |
| 1,361,464 | A | | 12/1920 | Hunt .............................. 47/47 |
| 1,617,494 | A | | 2/1927 | Nuckols ......................... 47/47 |
| 1,797,077 | A | | 3/1931 | Dew et al. .................... 248/121 |
| 2,009,867 | A | | 7/1935 | Ball ............................... 47/44 |
| 2,763,096 | A | | 9/1956 | Roger ............................ 47/45 |
| 2,764,846 | A | | 10/1956 | Worthington ................. 47/47 |
| 3,088,245 | A | | 5/1963 | Menge ........................... 47/47 |
| 3,105,327 | A | | 10/1963 | Gasper .......................... 47/47 |
| 3,113,400 | A | | 12/1963 | Emond .......................... 47/45 |
| 3,264,783 | A | | 8/1966 | Bayliss .......................... 47/45 |
| 3,299,569 | A | | 1/1967 | Lemrick ........................ 47/45 |
| 3,803,759 | A | * | 4/1974 | Heinecke ....................... 47/47 |
| 4,019,280 | A | | 4/1977 | Summers ....................... 47/45 |
| 4,841,670 | A | * | 6/1989 | Bitter ............................ 47/47 |
| 5,048,231 | A | | 9/1991 | Brown ........................... 47/45 |
| 5,174,060 | A | | 12/1992 | Glamos ......................... 47/45 |
| 5,179,799 | A | | 1/1993 | Hillestad ....................... 47/45 |
| 5,412,905 | A | | 5/1995 | Allison .......................... 47/30 |
| 5,423,148 | A | * | 6/1995 | Thornhill ..................... 47/29.1 |
| 5,595,019 | A | | 1/1997 | Foreman ....................... 47/47 |
| D396,390 | S | | 7/1998 | Edmondson .................... D8/1 |
| D403,560 | S | | 1/1999 | Ruggiero ........................ D8/1 |
| D406,021 | S | | 2/1999 | Grimes ........................... D8/1 |
| D413,233 | S | | 8/1999 | Allison ........................... D8/1 |
| 6,088,956 | A | | 7/2000 | Rocka ........................... 47/45 |

(Continued)

FOREIGN PATENT DOCUMENTS

DE 3400838 A1 * 7/1985

(Continued)

*Primary Examiner*—Francis T Palo
(74) *Attorney, Agent, or Firm*—Rick Matos; Innovar, L.L.C.

(57) ABSTRACT

A trellis system of the invention comprises a trellis and tool in combination. The trellis includes multiple legs and one or more horizontal supports. The tool includes a tray and a coning tool. The tray is adapted to slidably engage the legs by way of engagement means. The coning tool is adapted to engage the ends of the legs to facilitate shaping the trellis into a conical or pyramidal frame if desired. The trellis system can be used as a plant growth support and/or to hold potted plants. It can be installed into the ground or an existing potted plant. The trellis can be inverted position, the trellis can be used as a frame to build ornamental Christmas trees.

23 Claims, 5 Drawing Sheets

U.S. PATENT DOCUMENTS

| | | | |
|---|---|---|---|
| 6,349,502 B1 | 2/2002 | Fernandez | 47/45 |
| D459,492 S | 6/2002 | Branch | D25/126 |
| 6,453,606 B1 | 9/2002 | Shulman et al. | 47/47 |
| 6,588,143 B1 | 7/2003 | Merrell | 47/20.1 |
| 6,895,712 B2 | 5/2005 | Gunderman et al. | 47/39 |
| 2004/0216372 A1* | 11/2004 | Voogt | 47/39 |

FOREIGN PATENT DOCUMENTS

| | | | |
|---|---|---|---|
| JP | 10052344 A | * | 2/1998 |
| JP | 11178458 A | * | 7/1999 |
| JP | 2005185127 A | * | 7/2005 |

* cited by examiner

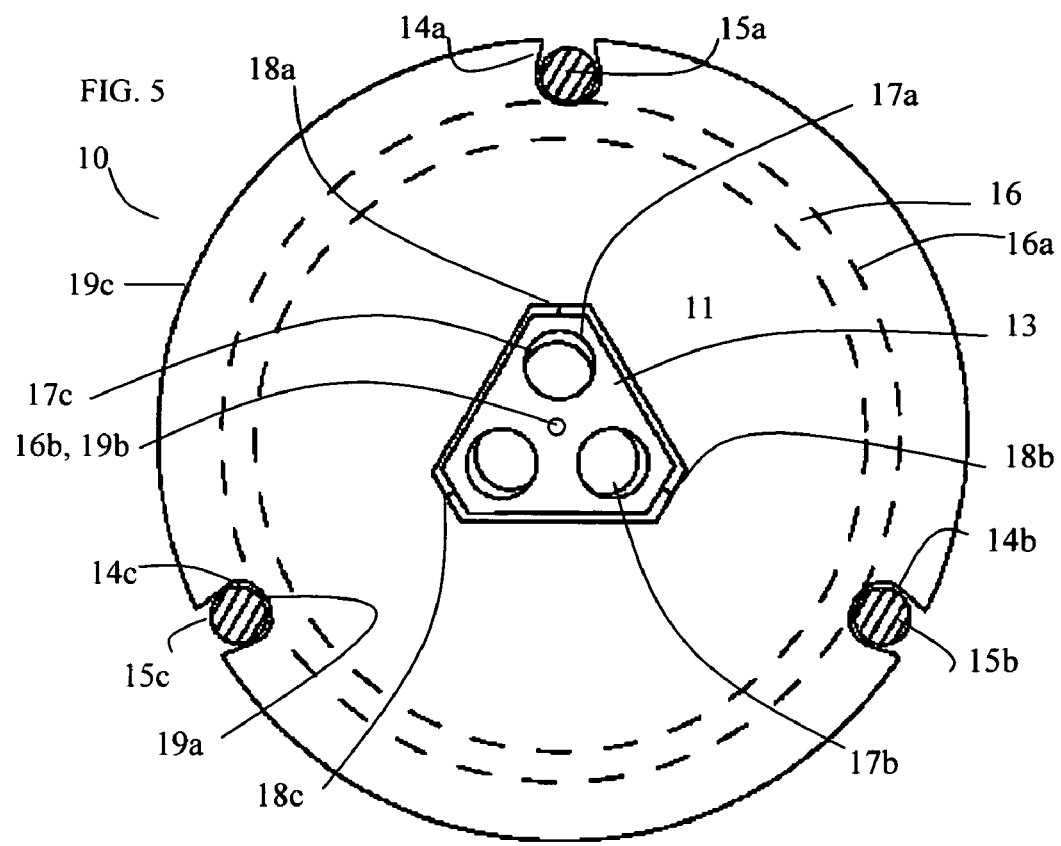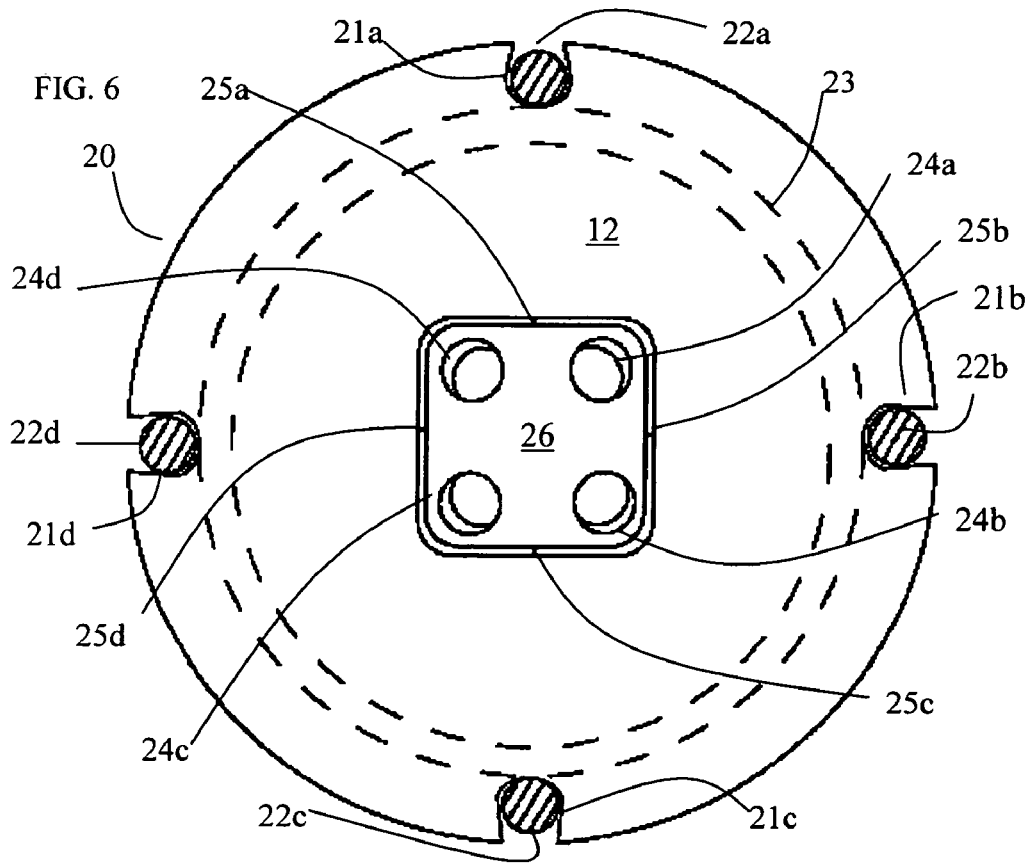

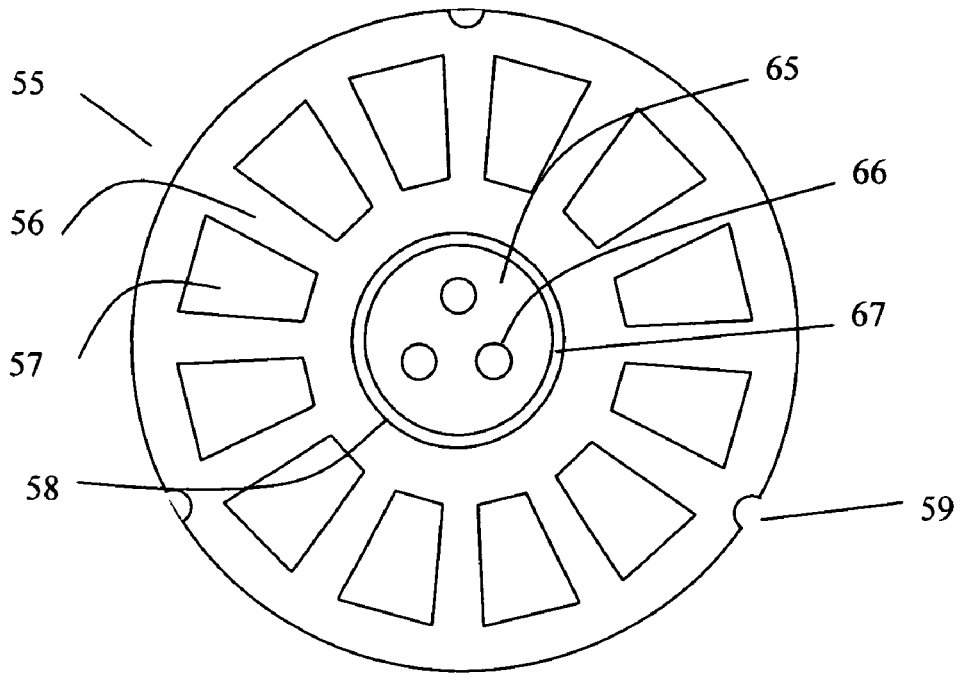
FIG. 12
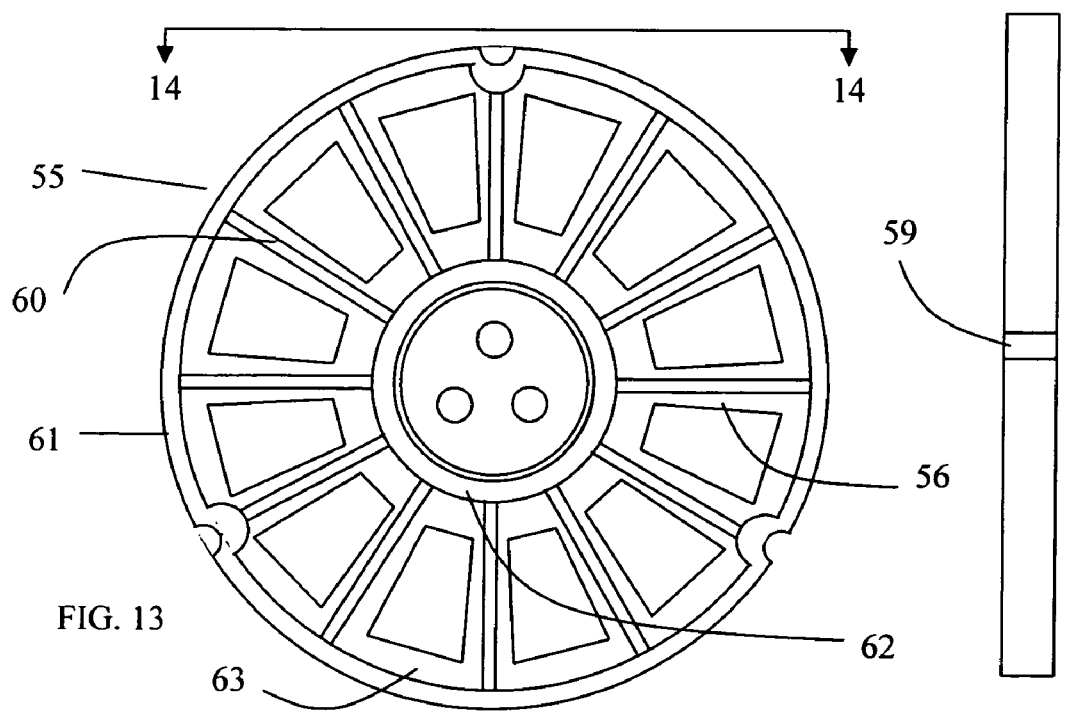
FIG. 13
FIG. 14

TRELLIS AND TOOL SYSTEM

FIELD OF THE INVENTION

The present invention relates to a combination trellis and tool system and to its methods of use and manufacture.

BACKGROUND OF THE INVENTION

Depending upon their construction, known trellises can be used to support plant growth or to hold potted plants. Multi-legged trellises are known in the art. Exemplary one are disclosed in U.S. Pat. No. 6,895,712, U.S. Pat. No. 6,588,143, U.S. Pat. No. 6,453,606, U.S. Pat. No. 6,349,502, U.S. Pat. No. 6,088,956, U.S. Pat. No. 5,595,019, U.S. Pat. No. 5,179,799, U.S. Pat. No. 5,048,231, U.S. Pat. No. 4,019,280, U.S. Pat. No. 3,299,569, U.S. Pat. No. 3,264,783, U.S. Pat. No. 3,113,400, U.S. Pat. No. 3,088,245, U.S. Pat. No. 2,009,867, U.S. Pat. No. 1,617,494, U.S. Pat. No. 1,361,464, U.S. Pat. No. 897,006, U.S. Pat. No. 760,879, U.S. Pat. No. 601,691, U.S. Pat. No. 212,604, U.S. Pat. No. D459,492, U.S. Pat. No. D406,021 and others.

U.S. Pat. No. 5,412,905 discloses a trellis having three support rings, wherein the larger ring is at top, and the rings below decrease in size in order. U.S. Pat. No. D413,233 discloses a trellis system very similar to that of the '905 patent except that the order of ring sizes is reversed from top to bottom.

U.S. Pat. No. 5,174,060 discloses a trellis with two rings and three support legs. The larger ring is a located at the top and the smaller ring closer to the bottom. A helical coil connects the two rings.

U.S. Pat. No. 2,763,096 discloses a sectional three-legged trellis that includes three equally-sized support rings. Each ring is made up of plural apertures. The sections of the trellis are stackable by way of seats located in several of the apertures of each of the rings.

To prevent having to buy and install different support structures for plants in containers and plants in the ground, it would be advantageous to use the same structure for both a cage for hanging plant limbs, vines, branches, and the like, and a support for a plant container. Most known structures, however, cannot perform both functions.

The materials used to make many of the known trellises are also unstable, flimsy, and/or too flexible wire frames. For example, the wire structures frequently deform or the welds holding the wire structure together break during the application of downward force to fix the structure to the ground, during use, or and when the wire structure is pulled from the ground. Thus, many of the known trellises are of limited use.

As such, it may be appreciated that there continues to be a need for a trellis adapted to provide a plant container support designed to effectively accommodate various sized containers and provides sturdy reliable support. Additionally, there is a need to provide a sufficiently rigid trellis that can withstand the rugged handling associated with repeated insertion and removal from the ground.

Each of the known trellises has a limited scope of use due to its construction. None of the known trellis systems employ a tool that cooperates with the trellis to provide additional utility to the trellis.

SUMMARY OF THE INVENTION

The present invention seeks to overcome the disadvantages present in known trellis systems and/or to provide additional utilitarian features over those known systems.

The invention provides a multi-legged (multi-strut, multiple vertical support) trellis having a multi-purpose tool engaged therewith. The trellis is constructed with one, two or more (multiple) vertically spaced horizontal support rings. The first ring is engaged in a fixed or removable manner with one end of the support legs. The second ring, if present, would be spaced away from the first ring and located somewhere between both ends of the support legs to create a balanced and stable trellis. The second ring would be engaged with the legs in a fixed or movable manner. The legs are straight and angled toward each other to form a conical type of frame. The legs can be evenly or unevenly spaced about the circumference of each ring. The rings are adapted to provide to the legs resilience or resistance toward displacement, thereby creating a biasing means adapted to bias the legs toward the longitudinal axis of the trellis when the legs are displaced therefrom. The tool can provide additional stability to the trellis.

The tool is constructed of a rigid or semi-rigid material. It can be used in conjunction with a trellis having one, two or more horizontal supports or it can be used in place of a horizontal support in a trellis having one, two or more horizontal supports. For example, the tool might be used in place of the smaller second ring or to cooperate with it. In some embodiments, the tool is comprised of resilient molded plastic. The tool comprises a tray including three or more engagement means (e.g. slip-fit, snap-fit joints) by way of which it engages the legs of the trellis. The tool is slidable and dimensioned in such a manner so that it separates (distends) the ends of the legs away from one another as the tool is slid or placed towards the bottom ends of the legs. In other words, the diameter of the tool is smaller than the diameter of the upper ring when the trellis is stood upright. The tool optionally comprises a tip engager (coning tool) adapted to engage the ends of the legs to maintain them adjacent one another.

One aspect of the invention provides a trellis system comprising a trellis and a tool, wherein:
the trellis comprises at least three elongated support legs and at least one horizontal support engaging the upper end of each of the support legs; and
a tool comprising a tray, wherein the tray comprises leg engagement means and is adapted to slidably engage the support legs at a location between the ends of the support legs.

In some embodiments, the horizontal support has an outer perimeter radius larger than the radius of the tray or at least larger than the shortest lateral distance between leg engagement means of the tray and the center of the plane defining it. The tray can comprise the same number of leg engagement means as there are support legs in the trellis. The tray can be a plate or ring, and it can be any geometric shape such as, without limitation, a circle, oval, square, or rectangle.

In some embodiments, the trellis comprises two horizontal supports: an upper support engaged to the ends of the support legs, and a lower support engaged with the legs but at a location spaced away from the upper support. The lower support can have a smaller outer diameter, as measured along the plane defining the support, than the upper support. As a result the legs of the trellis run parallel to the longitudinal axis of the trellis; however, together with the horizontal support(s) they form a conical (or pyramidal) frame whereby one end of the legs is spaced farther apart than the other end of the legs. In other words, when in the upright position, the upper ends of the legs of the trellis are generally laterally spaced farther apart than the lower ends of the legs.

The horizontal supports are generally transverse to or perpendicular to the longitudinal axis of the legs and/or trellis. In some embodiments, the horizontal support is fixedly engaged to the support legs. In other embodiments, it is slidably and/or removably engaged with the support legs. At each occurrence, the horizontal support is independently fixedly, slidably or removably engaged with corresponding support legs.

The legs can be evenly or unevenly spaced radially about the circumference of the horizontal support(s).

The tool optionally comprises a tip (end) engager adapted to engage the ends of the legs that are opposite the end engaged with the horizontal support.

These and other aspects of this invention will be apparent upon reference to the following detailed description, examples, claims and attached figures.

BRIEF DESCRIPTION OF THE FIGURES

The following drawings are given by way of illustration only, and thus are not intended to limit the scope of the present invention.

FIGS. 5-8 depict a bottom plan view of exemplary tools according to the invention.

FIG. 12 depicts a top plan view of an alternate embodiment of a tool according to the invention.

FIG. 13 depicts a bottom plan view of the tool of FIG. 12.

FIG. 14 depicts a side view of the tool of FIG. 12.

DETAILED DESCRIPTION OF THE INVENTION

Figure 1:
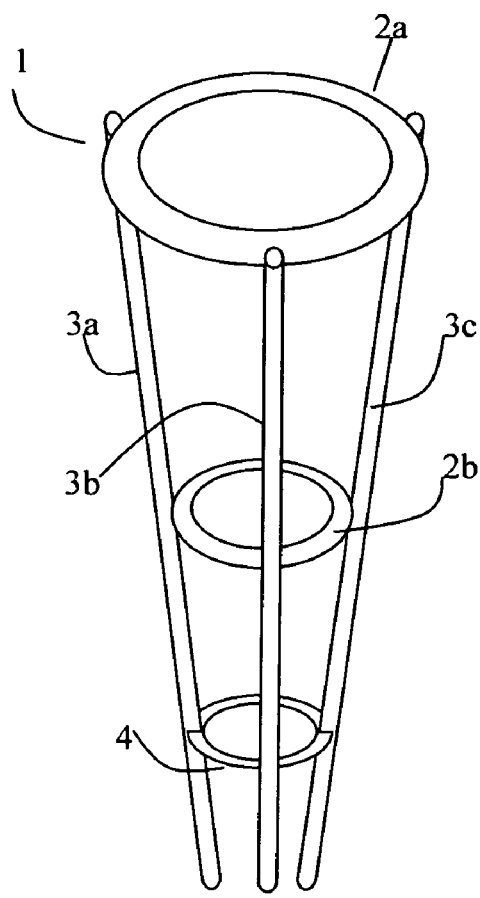
FIG. 1 depicts a perspective view of a multi-legged trellis engaged with a tool of the invention.

A trellis system of the invention provides unexpected advantages over other trellises. The trellis system is portable and can be utilized directly in the lawn and garden landscape/terrain industry. It can be installed into an existing potted plant or base unit, to be topped of with other greenery or flowering plant, pumpkin, gazing ball or any round or convoluted decorator piece to create a decorative display. The trellis system can also provide a means to display plant in location where they would otherwise not be displayable. For example, a trellis with a potted plant could be installed along a sidewalk or pool or other such location where it would difficult to display a hanging potted plant. The trellis can also be installed in inclined or level surfaces.

The bottom ends can be adapted to engage with and penetrate into the earth to anchor the plant support to the earth. The trellis can be shaped so as to provide support to plants growing out of the ground and to support plant containers (pots) that are placed within the plant cage interior. The trellis can be shaped to facilitate the stacking of a plurality of the plant cages for storage.

A trellis system of the invention comprises a combination of a trellis and a tool. The trellis can comprise three or more vertical supports (legs) and one or more horizontal supports (support rings). The trellis system (1) of FIG. 1 includes a trellis and a tool (4). The trellis comprises three legs (elongated supports 3a-3c) that are parallel to the longitudinal axis of the trellis but that are angled inwardly toward the bottom of the trellis and outwardly toward the top of the trellis. The exemplary trellis also comprises two horizontal supports (rings 2a, 2b). The top ring (2a) is fixedly engaged with the legs at or near the upper end of each leg. The lower ring (2b) is smaller in diameter (as measured along the plane of the rings) than the upper ring (2a). The lower ring is spaced away from the upper ring in a direction toward the lower ends of the legs. The lower ring is also fixedly engaged with the legs; however, it can be removably engaged with the legs. By virtue of the differences in outer diameter of the support rings, the legs of the trellis are angled so that the trellis forms a conical or pyramidal frame.

The legs of the trellis are fixedly engaged with and evenly spaced about the outer perimeter of the upper horizontal support ring. However, the legs can be unevenly spaced about the perimeter of the ring, and the legs can be engaged with the inner perimeter, rather than the outer perimeter, of the ring.

The tool (4) is depicted engaged with the legs at a location below the lower ring or between the lower ring and the lower ends of the legs. In this use, the tool serves to distend the legs away from each other or away from the longitudinal axis of the trellis during installation of the trellis into soil, for example. The closer the tool is towards the lower end of the legs, the more it distends the legs. However, following installation of the trellis with the tool, the tool can be placed between the two rings (2a, 2b) or merely on top of the lower ring, wherein it can serve to support a flowerpot, candle, gazing ball or other decorative garden ornaments, for example.

Since the legs are resistant toward distension from the longitudinal axis of the trellis, by virtue of there engagement with one or more horizontal support rings, they spring back toward their original orientations following disengagement of the tool from the lower portion of the trellis. In this way, the legs grasp the soil (and root system, if present) within which they are placed thereby providing greater stability to the trellis.

Figure 2:
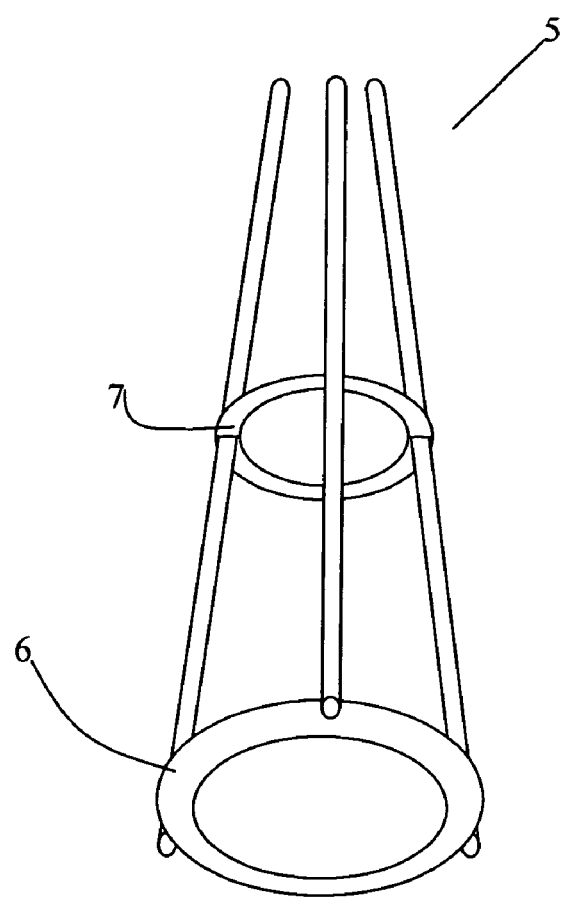
FIG. 2 depicts a perspective view of another embodiment of a multi-legged trellis engaged with a tool of the invention.

The trellis system (5) of FIG. 2 is similar to that of FIG. 1 except that it comprises a single horizontal support (6) rather than two horizontal supports. The tool (7) takes the place of the second horizontal support. The diameter of the leg engagement means of the tool is narrower than the outer diameter of the horizontal support, so the legs of the support are angled inwardly toward the longitudinal axis from one end of the trellis to the other. The trellis system (5) is depicted inverted to demonstrate that a trellis of the invention can stand on either end. In the inverted position, the trellis can be used as a frame for a shock of corn stalks or for an ornamental tree or plant, e.g. an ornamental Christmas cone tree, corn shock for Fall-harvest decorations, grapevine and other vines to make a spiral tree, outdoor foliage trees, and other known artificial plants or trees as well as a string of lights and/or other ornaments.

A support leg is an elongated support member such as a pole, tube, wire, or rod. The length of each of the legs in a trellis will generally be about the same within about 15% of the average length; however, the invention also includes embodiments wherein one or more of the legs has a different length than the other leg(s) in the trellis. The diameter or thickness of the legs can be adapted as needed to provide the desired level of strength. The legs of the trellis are of sufficient strength to be drivable by hand into the ground without collapse of the trellis or without excessive bending of the legs. They are also sufficiently strong to bear the weight of the plant(s) or plant pot(s) that the trellis is holding. The legs are of sufficiently flexible to permit at least some flexing by hand so as to facilitate operation of the combination tool. For example, after flexing, the legs preferably have sufficient resiliency to spring back to their original position thereby grasping the matrix (soil, rocks, gravel, sand, etc.) within which the trellis is installed. This flexing feature is useful for improving the stability of an installed trellis.

Any sturdy material can be used to prepare a trellis and/or tool according to the invention. The material(s) used to make the trellis and tool are independently selected at each occurrence. Suitable materials include, by way of example and without limitation, iron, steel, plastic-coated steel, aluminum, powder coated steel, fiberglass, metal, wood, plastic, polyurethane, polypropylene, and other rigid or even semi-flexible material or combination of materials. One of the proposed embodiments includes a plastic sleeve encasing a hollow metal tube or encasing a folded and/or rolled metal sheet. In some embodiments, the leg comprises hot rolled round rod (e.g. metal, iron, steel), which can be 3/16" to 3/8" or about 1/4" in diameter. In some embodiments, the horizontal support comprises hot rolled round rod (e.g. metal, iron, steel), which can be 3/16" to 3/8" or about 3/8" in diameter. Depending upon the material used to make the tool, the thickness of the tray and/or end engager can be varied.

Figure 3A:
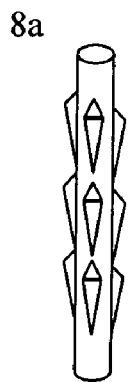
FIGS. 3a and 3b depict a side view of a portion of some of the optional surface configurations of a leg or elongated support according to the invention.
Figure 3B:
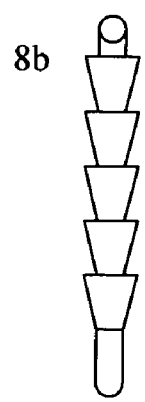

The surface of the legs can be adapted to vary the frictional engagement with the tool. The surface of the legs can be smooth, semis-smooth or rough (textured). Exemplary rough surfaces include, without limitation, a knurled, bumpy, gritty, sandy, jagged, stepped, variably raised, fluted and other surface textures typically used for such purpose. Exemplary surfaces are depicted in FIGS. 3a and 3b. In particular, the surface can have a textured surface used to enhance engagement with the tool and keep it vertically in place during extended use. In some embodiments, the legs comprise a powder coated surface (e.g. powder coated metal rod) thereby providing a semi-smooth surface to permit ease of sliding the tool along the legs while at the same time providing a sufficiently frictional surface to resist undesired slippage of the tool when engaged with the legs prior to placement in a matrix and while the legs are distended.

Figure 4:
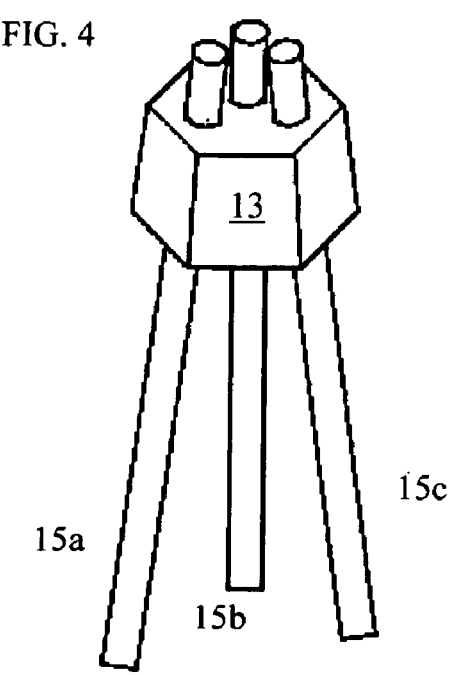
FIG. 4 depicts a perspective view of an embodiment of a leg end engager according to the invention.

The tool of the invention optionally comprises an end engager (or coning tool). The end engager is adapted to engage the legs at their end or at a location near the end. FIG. 4 depicts an end engager (13) engaged to three legs (15a-15c). The end engager is depicted with the ends of the legs extending through the engager; however, other embodiments of the invention include those wherein the ends abut the interior of respective cavities in the engager and do not extend through the engager.

The end engager will typically comprise the same number of engagement means as there are legs on a corresponding trellis. The end engager is engaged with the ends of the legs by compressing the ends of the legs together and then sliding the engager into place. The resulting conical or pyramidal frame trellis can then be used in the inverted position (small end upwards) as a frame onto which decorative items such as grapevine, foliage, greenery, live florals, silk, and other ornaments can be hung, draped, wrapped, or otherwise attached. A tree-topper, star ball or other such ornaments can be placed onto the frame.

The horizontal supports are arranged in a vertically spaced relation along the length of the legs between the top and bottom ends of the legs. When three or more horizontal supports are included, they can be longitudinally spaced evenly or unevenly along the length of the legs. In one embodiment, the plurality of horizontal supports can be two or more rings that are concentric around a common vertical central axis, e.g. the longitudinal axis of the trellis. These horizontal rings have progressively differing central opening diameters, i.e. the inner diameter of the ring as measured along the plane defining the ring. The central opening diameters of the rings increase as the rings can be arranged along the length of the legs with the bottom or lower most ring having a smallest central opening diameter and the top or upper most ring having a largest central opening diameter.

The diameter of the central hole in the horizontal supports can vary as needed. In one embodiment, the diameter of the central hole is adapted to accommodate standard flower (plant) pot sizes used in the nursery industry, e.g. pots having a 4" to 24" diameter.

In one embodiment of the trellis, the legs extend upwardly generally parallel to the vertical central axis from their bottom ends to the bottom or lower most ring. This upright, vertical orientation of the bottom ends of the legs can facilitate their insertion into the ground without bending. The legs then diverge outwardly from the vertical central axis as the legs extend upwardly from the bottom ring to their top ends.

The horizontal supports of the trellis are depicted as being circular or oval, when depicted from a plan view. However, they can also be square, rectangular, pentagonal, hexagon or other geometric shape.

The combination tool (10) depicted in bottom plan view in FIG. 5 comprises a tray (11) and an end engager (13). The tray is engaged with three legs (15a-15c depicted in cross-section) by way of three respective engagement means (14a-14c). Above the tray is a horizontal support ring (16 depicted in dashed lines) of a trellis. In this example, the engagement means is a slip-fit, press-fit, snap-fit or pressure-fit joint; however, other types of engagement means can be employed. The bores of the joints can be angled with respect to the plane of the tray. In some embodiments, the angle of the aperture approximates the angle of the legs of a trellis when it is configured to form a conical or pyramidal frame. In some embodiments, the angle is from 3 to 15 degrees or 5 to 10 degrees or about 8 degrees off of an axis perpendicular to the plane of the tray. The inner diameter of the apertures approximates the outer diameter of the legs to which they are adapted to engage.

The engagement means of the tray can be adapted to be slidable along the surface of the legs with which they engage. If the legs have a textured surface, then engagement means can be adapted to cooperate with the textured surface of the legs to enhance frictional engagement between the engagement means and the leg.

In this embodiment, the radius of the tray (11) as measured from the outer perimeter (19c) of the tray to the center (19b) of the plane defining the tray is larger than the radius of the horizontal support ring (16) as measured from the outer perimeter (16a) of the ring to the center (16b) of the plane defining the ring. The radius of the engagement means (14a-14c) as measured from the innermost proximal surface (19a) of the engagement means to the center (19b) of the plane defining the tray approximates or is smaller than the radius of the horizontal support ring (16) as measured from the outer perimeter (16a) of the ring to the center (16b) of the plane defining the ring.

The end engager comprises three apertures (17a-17c) that serve as leg engagement means by way of which the engager can be attached to the ends of three respective legs. The apertures are depicted as being bored in an angled direction, the angle being from 3 to 15 degrees off of an axis perpendicular to the plane through which the apertures pass. The angle of the aperture approximates the angle of the legs of trellis when it is configured to form a conical or pyramidal frame. The end engager is attached to the tray by way of breakable elements (18a-18c). In some embodiments, the end engager comprises the same material(s) that the tray comprises. In other embodiments, one or more of the materials are different. The inner diameter of the apertures approximates the outer diameter of the legs to which they are adapted to engage.

The combination tool (20) of FIG. 6 (also depicted in bottom plan view) comprises a tray (12) and an end engager (26), the tool being below a horizontal support ring (23 depicted in dashed lines). The tray comprises four engagement means (21a-21d) by way of which it is engaged with four legs (22a-22d depicted in cross-section) of a trellis. The end engager comprises the same number of leg engagement means (24a-24d) as does the tray. It can be separated from the tray by breaking the breakable mounting elements (25a-25d).

Figure 7:
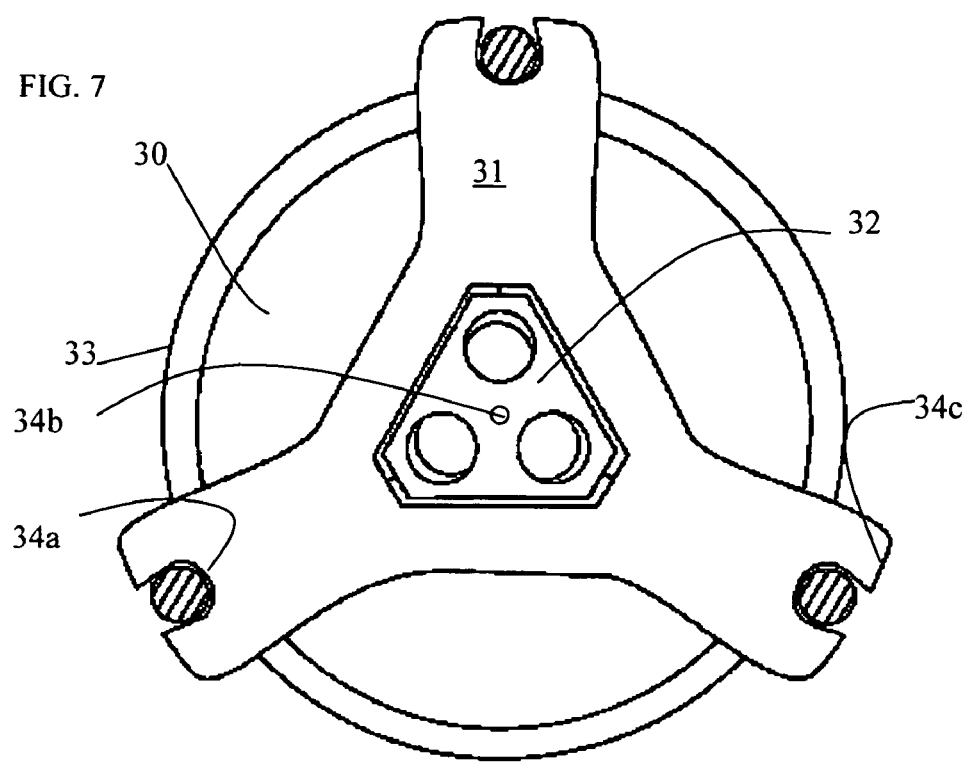

The combination tool (30) of FIG. 7 is depicted in bottom plan view. The tool comprises an end engager (32) and a tridentate tray (31), which is engaged with three respective legs (depicted in cross-section) of a three-legged trellis by way of respective engagement means in each arm of the tray. The ring (33) has an outer radius (measured along the plan defining the ring) about the same size as or larger than the radius of the engagement means as measured from the most proximal surface (34a) of engagement means to the center (34b) of the plane defining the tray. The outer most radius of the arms of the tray, as measured from the most distal perimeter portions of the arms (34c) to the center (34b) is larger than the radius of the horizontal support ring.

Figure 8:
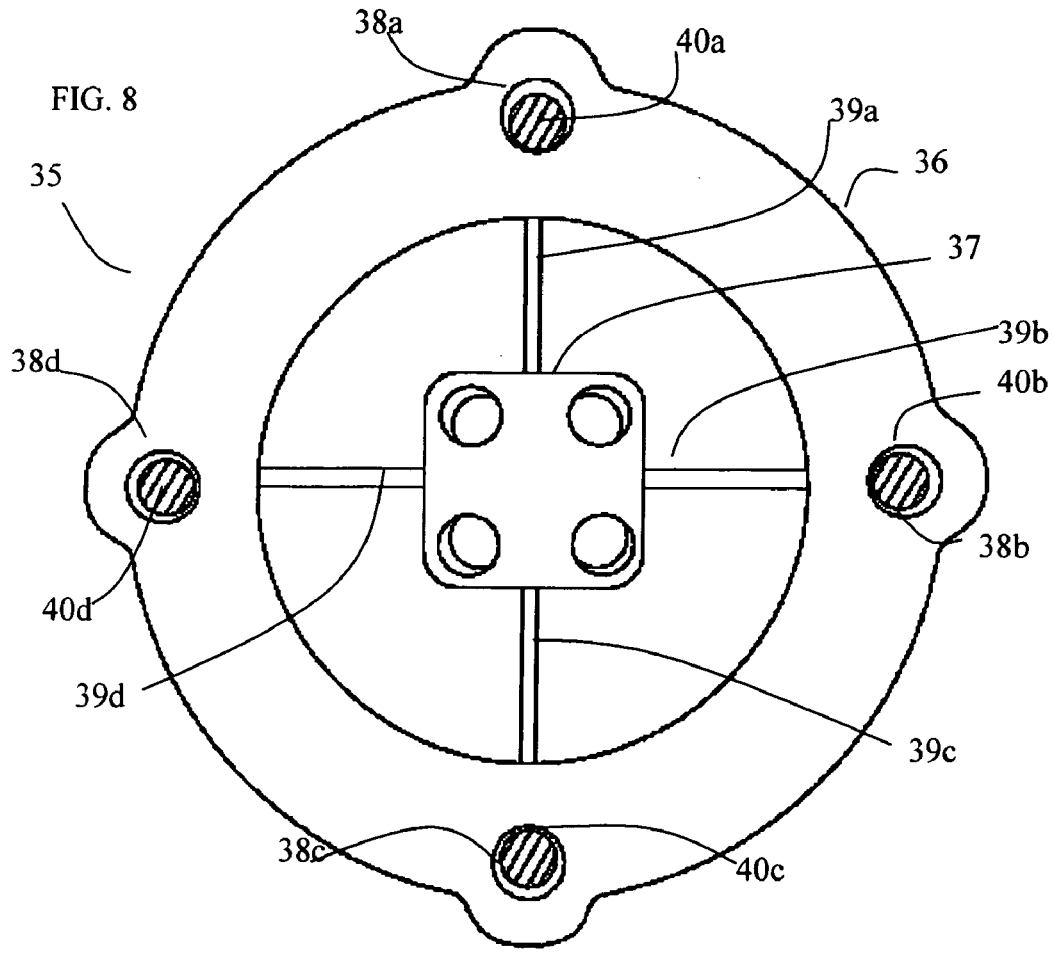

The combination tool (35) of FIG. 8 is depicted in bottom plan view. The tool comprises a ring-shaped tray (36), which is engaged with four respective legs (40a-40d depicted in cross-section) of a four-legged trellis by way of respective engagement means (38a-38d) in the tray. In this embodiment, engagement means is an aperture extending through the tray. This tool is depicted in use with a trellis having a single horizontal support ring engaged to the end of the legs of the trellis; however, it can be used with a trellis having two or more horizontal support rings. The end engager (37) comprises a body having four angled apertures. The end engager is attached to the tray by plural breakable mounting elements (39a-39d).

Figure 9A:
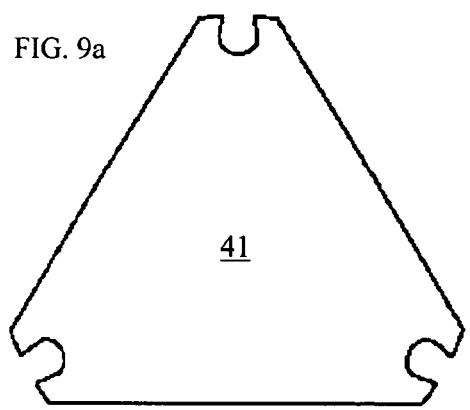
FIGS. 9a-9b depicts a top plan view of alternate embodiments of the tool according to the invention.
Figure 9B:
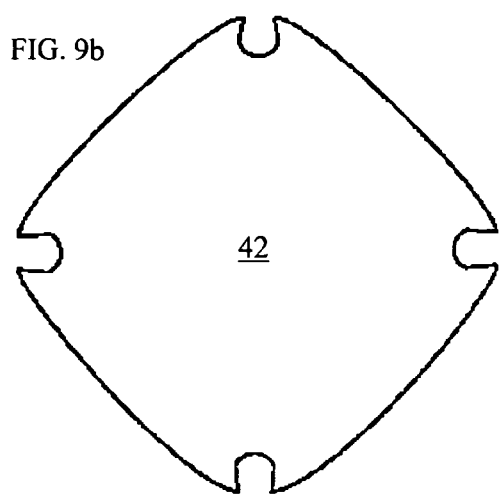

The tool of the invention optionally includes an end engager. The tools (41, 42) depicted in FIGS. 9a-9b do not include an end engager. In these embodiments, the tool is a tray comprising a body and plural leg engagement means. As noted above, the shape of the body of the tray can be any shape desired.

Figure 10:
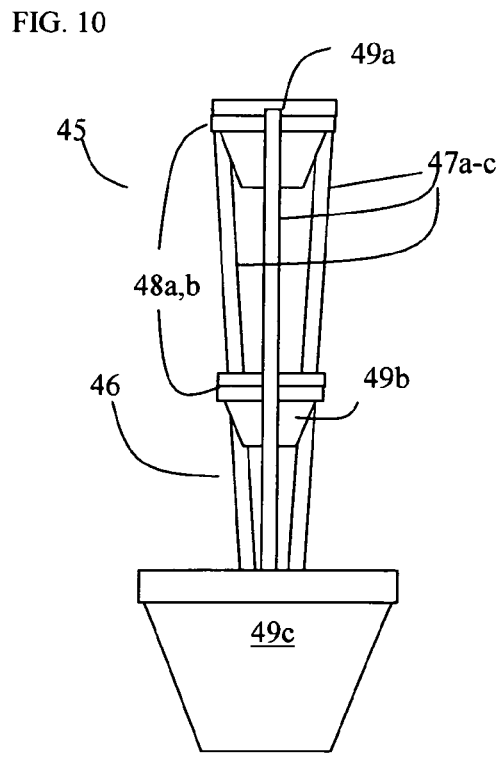
FIG. 10 depicts a side view of a trellis system of the invention in one exemplary use.

The trellis system of the invention is used to support plant growth and/or to support one or more plant pots. FIG. 10 depicts a trellis system (45) having been installed in a larger plant pot (49c). The trellis (46) comprises three legs (47a-c) and two horizontal support rings (48a, 48b). Each of the rings supports a respective pot (49a, 49b), the upper pot generally being of a larger capacity or diameter than the lower pot. The trellis is installed by engaging a tool with the legs at a position below the lower ring (48b) and sliding the tool downwards to distend the ends of the legs from each other. The trellis is then placed into the lower pot (49c) generally containing dirt, rock, gravel or other suitable material. The tool is then raised to allow the legs to converge towards each other thereby compressing the dirt between the legs of the trellis. By so doing, the trellis more firmly grasps the dirt and is more stable than if it had just been pushed into the soil in the lower pot (49c).

In a like manner, the trellis system can be used to install a trellis into the ground. The tool is engaged with the legs of the trellis at a position below the lowest ring and slid downwards to distend the ends of the legs from each other. The trellis is then pressed into the soil, and the tool is raised to allow the legs to converge towards each other thereby compressing the soil between the legs of the trellis. The tool of the invention thus facilitates installation of frame-type trellis on the one hand and provides a more firmly installed trellis on the other hand. The trellis can also be placed in other bases, besides soil, for other occasions. For example, a Styrofoam® filled container can be used as the base thereby making the entire unit light weight and easy to transport.

The tool can be designed to support standard nursery container hanging baskets and pots. After installation of the trellis, the tray portion of the tool can be used as a support for additional items such as a candleholder, lantern holder, flowerpot holder, vase, gazing ball, birdhouse, bird feeder and other items.

The potting stacking feature of the trellis system is advantageous as it permits drainage from the upper plant(s) to pass through to the lower plant(s). In addition, the plants are elevated to multi-level heights to enhance the aesthetic appearance of landscape.

Figure 11:
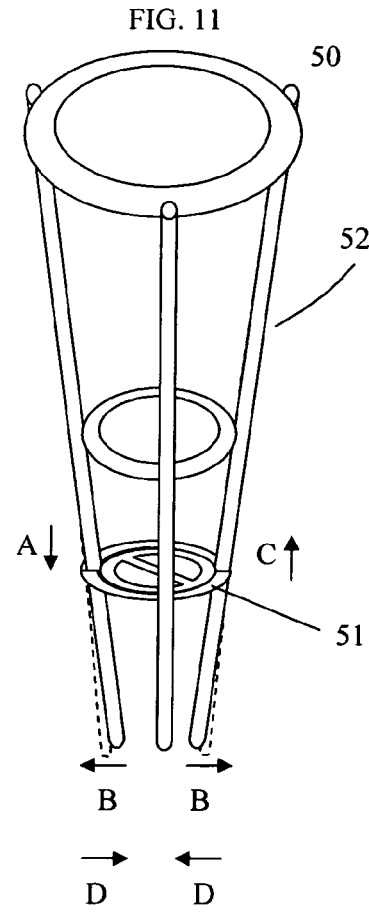
FIG. 11 depicts another perspective view of a multi-legged trellis engaged with a tool of the invention.

FIG. 11 depicts a perspective view of a trellis system comprising a trellis (50) and plate (51) engaged therewith. The radial spacing of the peripheral apertures of the plate from the concentric or radial center of the plate is sized to approximate or be slightly smaller than (within 5%, 10%, 15% or 20%) the outer diameter of the lower horizontal ring. When the plate is slid vertically in the direction of arrow (A) towards the bottom end of the support legs, the legs are distended radially along arrows (B) from the longitudinal center of the trellis toward a distended position (indicated by the dashed lines). The distended trellis is then installed into a matrix after which the plate is slid vertically in the direction of arrow (C) towards the top end of the trellis (or towards the lower support ring). Since the legs are resilient and fixedly engaged with the lower and/or upper support ring, they are biased towards the longitudinal axis of the trellis. When the plate is slid upwards, the legs tend to reposition themselves along arrows (D) toward their original position prior to installation (as indicated by the solid lines) to the extent that they can. Any substantial deviation from their original position is generally due to the presence of the matrix material grasped between the lower ends of the legs.

FIG. 12 depicts the top plan view of an alternate exemplary plate (55) and end engager (65) forming a tool of the invention. The plate is defined by a radially outer ring and a radially inner ring held together by plural radially extending arms (56), which are spaced apart by plural apertures (57). This particular tool is adapted to engage with or for use with a three-legged trellis, since it comprises three engagement means (apertures 59). The end engager (65) comprises three engagement means (apertures 66) for engaging the ends or near the ends of the trellis. The end engager is affixed to the plate by way of rupturable attachment means (67), which in this example is a thin strip of rupturable material attached to the outer circumference of the end engager and the inner circumference of the bore (58) of the plate. The rupturable attachment means can be any such means typically used in the fabricating industries for removably affixing one element to another.

FIG. 13 depicts a bottom plan view of the plate (55) of FIG. 12. The radially outer ring (61) and the radially inner ring (62) have raised edges which serve to provide support and strength to the rings. The plural radially extending arms (56) comprise ribs (60) that provide support and strength to the arms. The sections (63) defined by the ribs (60) and the raised edges of the rings (61, 62) are recessed.

FIG. 14 depicts a side view of the plate (55) of FIG. 12. The thickness of the plate can vary as needed depending upon the materials used to construct it, the resilience of the support legs, and/or the weight of an object it is adapted to bear.

However, in order to facilitate construction and use, the thickness of the plate is generally from ¼" to 2" or from ½" to 1.5" or from ¾" to 1.25".

The above is a detailed description of particular embodiments of the invention. It will be appreciated that, although specific embodiments of the invention have been described herein for purposes of illustration, various modifications may be made without departing from the spirit and scope of the invention. Accordingly, the invention is not limited except as by the appended claims. All of the embodiments disclosed and claimed herein can be made and executed without undue experimentation in light of the present disclosure.

The invention claimed is:

1. A trellis system comprising a trellis and a tool, wherein:
   the trellis comprises at least three elongated support legs and at least one horizontal support engaging the upper end of each of the support legs; and
   a tool comprising a tray and a removable end engager adapted to engage the ends of the legs, wherein the tray comprises leg engagement means and is adapted to slidably engage the support legs at a location between the ends of the support legs, wherein the tray comprises a radially outer ring, a radially inner ring and plural radially extending arms engaged to the outer ring and the inner ring.

2. The system of claim 1, wherein at least one horizontal support is fixedly engaged with the upper ends of each of the support legs.

3. The system of claim 2, wherein the tray comprises the same number of leg engagement means as there are support legs in the trellis.

4. The system of claim 2, wherein the trellis comprises at least two horizontal supports that are longitudinally spaced apart and are engaged with the legs, the second horizontal support being engaged with the legs at a location between the ends of the legs.

5. The system of claim 4, wherein the second horizontal support has a smaller outer diameter than the first horizontal support.

6. The system of claim 5, wherein the second horizontal support has an outer perimeter radius larger than the radius of the tray or at least larger than the shortest lateral distance between leg engagement means of the tray and the center of the plane defining it.

7. The system of claim 5, wherein the tray has an outer perimeter radius larger than the outer perimeter radius of the second horizontal support.

8. The system of claim 1, wherein the end engager comprises the same number of leg engagement means as there are support legs in the trellis.

9. The system of claim 8, wherein the tray comprises the same number of leg engagement means as there are support legs in the trellis.

10. The system of claim 1, wherein the tray is a plate or ring.

11. The system of claim 1, wherein the horizontal support has an outer perimeter radius larger than the radius of the tray or at least larger than the shortest lateral or radial distance between leg engagement means of the tray and the center of the plane defining it.

12. The system of claim 11, wherein the trellis has a conical or pyramidal frame shape.

13. The system of claim 11, wherein the upper ends of the legs of the trellis are laterally spaced farther apart than the lower ends of the legs.

14. The system of claim 1, wherein the angle of the legs, with respect to the longitudinal axis of the trellis, ranges from 3 to 15 degrees, wherein the lower end of the legs is closer to the axis than the upper end of the legs.

15. The system of claim 1, wherein the legs comprise a textured exterior surface.

16. A trellis system comprising a trellis and a tool, wherein:
   the trellis comprises at least three elongated support legs, a horizontal support fixedly engaging the upper end of each of the support legs, and a second horizontal support engaged with the legs at a location between the ends of the legs; and
   a tool comprising a tray and a removable end engager adapted to engage the ends of the legs, wherein the tray comprises leg engagement means and is adapted to slidably engage the support legs at a location between the ends of the support legs, wherein the tray comprises a radially outer ring, a radially inner ring and plural radially extending arms engaged to the outer ring and the inner ring;
   the second horizontal support has a smaller outer perimeter diameter than the outer perimeter diameter of the first horizontal support; and
   the second horizontal support has an outer perimeter radius larger than the radius of the tray or at least larger than the shortest lateral distance between leg engagement means of the tray and the center of the plane defining it.

17. The trellis system of claim 16, wherein the second horizontal support is fixedly engaged with the legs.

18. The trellis system of claim 17, wherein the legs are evenly spaced about the perimeter of the horizontal supports.

19. The trellis of claim 17, wherein the legs are engaged along the outer perimeter of the horizontal supports.

20. The trellis system of claim 16, wherein the end engager comprises the same number of leg engagement means as there are support legs in the trellis.

21. The system of claim 16, wherein the tray comprises the same number of leg engagement means as there are support legs in the trellis.

22. A trellis system comprising a trellis and a tool, wherein:
   the trellis comprises at least three elongated support legs, a horizontal support engaging the upper end of each of the support legs, and a second horizontal support engaged with the legs at a location between the ends of the legs; and
   a tool comprising a tray, wherein the tray comprises leg engagement means and is adapted to slidably engage the support legs at a location between the ends of the support legs, wherein the tray comprises a radially outer ring, a radially inner ring and plural radially extending arms engaged to the outer ring and the inner ring;
   the second horizontal support has a smaller outer perimeter diameter than the outer perimeter diameter of the first horizontal support;
   the second horizontal support has an outer perimeter radius larger than the radius of the tray or at least larger than the shortest lateral distance between leg engagement means of the tray and the center of the plane defining it; and
   the tool further comprises a removable end engager comprising leg engagement means.

23. The trellis system of claim 22, wherein the legs are engaged evenly spaced about the outer perimeter of the horizontal supports.

* * * * *